United States Patent
Fang et al.

(10) Patent No.: US 11,778,692 B2
(45) Date of Patent: Oct. 3, 2023

(54) DATA TRANSMISSION METHOD, APPARATUS, AND DEVICE IN WI-FI NETWORK

(71) Applicant: Huawei Technologies Co., Ltd., Shenzhen (CN)

(72) Inventors: Ping Fang, Shenzhen (CN); Zhengbing Li, Shenzhen (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 0 days.

(21) Appl. No.: 17/287,383

(22) PCT Filed: Oct. 22, 2019

(86) PCT No.: PCT/CN2019/112391
§ 371 (c)(1),
(2) Date: Apr. 21, 2021

(87) PCT Pub. No.: WO2020/083263
PCT Pub. Date: Apr. 30, 2020

(65) Prior Publication Data
US 2021/0392720 A1     Dec. 16, 2021

(30) Foreign Application Priority Data

Oct. 22, 2018  (CN) .......................... 201811232110.5
Jun. 24, 2019  (CN) .......................... 201910547973.X (51) Int. Cl.
*H04W 80/04*     (2009.01)
*H04W 72/12*     (2023.01)
(Continued)

(52) U.S. Cl.
CPC ....... *H04W 80/04* (2013.01); *H04W 72/1221* (2013.01); *H04W 72/569* (2023.01); *H04W 84/12* (2013.01)

(58) Field of Classification Search
CPC ............. H04W 80/04; H04W 72/1221; H04W 72/1242; H04W 84/12
See application file for complete search history.

(56) References Cited

U.S. PATENT DOCUMENTS 9,923,836 B1 *  3/2018  Vivanco .............. H04L 47/2475
2004/0177107 A1  9/2004  Qing et al.
(Continued)

FOREIGN PATENT DOCUMENTS

CN     101541048 A     9/2009
CN     101938415 A     1/2011
(Continued)

OTHER PUBLICATIONS

Shuzhen, C., "The Research of Qos Intelligent Control System for Broadband Network Based on COA and COPS Protocol," South China University of Technology, 01 Issue, 2013, with an English Abstract, 104 pages.
(Continued)

*Primary Examiner* — Siming Liu
(74) *Attorney, Agent, or Firm* — Conley Rose, P.C.

(57) ABSTRACT

Embodiments of this application disclose a data transmission method, an apparatus, and a device in a Wi-Fi network, to improve reliability of providing differentiated data transmission services by a network access device. The method includes: receiving an uplink packet; recording a real-time transmission indication and uplink 5-tuple information that are carried in the uplink packet; then receiving a downlink packet, where the downlink packet carries downlink 5-tuple information; and then, if a service type of the downlink packet is a preset service type, and the downlink 5-tuple information matches the uplink 5-tuple information, preferably forwarding the downlink packet based on the real-time transmission indication.

20 Claims, 3 Drawing Sheets

(51) Int. Cl.
*H04W 72/566* (2023.01)
*H04W 84/12* (2009.01)

(56) References Cited

U.S. PATENT DOCUMENTS

| | | | |
|---|---|---|---|
| 2005/0083412 | A1 | 4/2005 | Murphy |
| 2007/0177541 | A1 | 8/2007 | Kwon et al. |
| 2007/0242627 | A1* | 10/2007 | Thai .................... H04L 47/2441 370/278 |
| 2009/0010259 | A1 | 1/2009 | Sirotkin |
| 2014/0376555 | A1* | 12/2014 | Choi ........................ H04L 49/70 370/395.53 |
| 2015/0109909 | A1* | 4/2015 | Yeddala ................ H04W 12/08 370/328 |
| 2017/0048126 | A1* | 2/2017 | Handige Shankar ... H04L 41/40 |
| 2017/0105205 | A1 | 4/2017 | Lu et al. |

FOREIGN PATENT DOCUMENTS

| | | |
|---|---|---|
| CN | 102201981 A | 9/2011 |
| CN | 103873356 A | 6/2014 |
| CN | 104038442 A | 9/2014 |
| CN | 105262703 A | 1/2016 |
| CN | 105282102 A | 1/2016 |
| CN | 107733742 A | 2/2018 |
| EP | 1916801 A1 | 4/2008 |
| EP | 2416537 A1 | 2/2012 |
| EP | 2457398 B1 | 10/2018 |
| WO | 2011011311 A2 | 1/2011 |
| WO | 2015196433 A1 | 12/2015 |

OTHER PUBLICATIONS

IS0/IEC/ IEEE 8802-11, Second edition May 2018, "Information technology—Telecommunications and information exchange between systems—Local and metropolitan area networks—Specific requirements—Part 11: Wireless LAN medium access control (MAC) and physical layer (PHY) specifications," 2016, 3538 pages.

* cited by examiner

DATA TRANSMISSION METHOD, APPARATUS, AND DEVICE IN WI-FI NETWORK

CROSS-REFERENCE TO RELATED APPLICATIONS

This application is a national stage of International Application No. PCT/CN2019/112391, filed on Oct. 22, 2019, which claims priority to Chinese Patent Application No. 201910547973.X, filed on Jun. 24, 2019, and Chinese Patent Application No. 201811232110.5, filed on Oct. 22, 2018. All of the aforementioned patent applications are hereby incorporated by reference in their entireties.

TECHNICAL FIELD

This application relates to the field of communications technologies, and in particular, to a data transmission method, an apparatus, and a device in a wireless fidelity (wireless fidelity, WiFi) network.

BACKGROUND

In an existing wireless fidelity (wireless fidelity, WiFi) system, different terminals, for example, stations (station, STA), under a same access point (access point, AP, also referred to as a home router or a home gateway) usually preempt network resources through contention, to complete data transmission of various services, such as voice, videos, web browsing, downloading, and games. Therefore, in a case of a relatively poor communication environment, for example, in a case of relatively strong interference, a relatively weak signal, insufficient resources, or relatively heavy load, data transmission of some terminals may have adverse impact on data transmission of the other terminals. For example, a video playback service of a terminal A occupies a relatively high bandwidth, and may occupy an available bandwidth of a game service of a terminal B. Consequently, a downlink transmission delay of the game service of the terminal B is increased, causing game freezing.

Therefore, an existing wireless quality of service (quality of service, QoS) protocol, for example, a Wi-Fi multimedia (WiFi multimedia, WMM) protocol, defines priority queues of four access categories (access category, AC) in descending order of priorities: a voice (voice, VO) flow, a video (video, VI) flow, a best-effort (best-effort, BE) flow, and a background (back-ground, BK) flow. Therefore, the AP may preferably forward data of a service with a high-priority access category, to separately provide differentiated data transmission services for different service types.

However, in an actual data transmission process, especially in a downlink data transmission process, the foregoing priorities usually cannot be effectively executed. For example, a specified priority is ignored (for example, not supported, not parsed, or not executed), a specified priority is tampered with (for example, randomly reduced or increased), or priority setting permission is randomly used (for example, all types of services are set to a highest priority). Consequently, reliability of providing differentiated data transmission services in an existing Wi-Fi network is relatively poor.

SUMMARY

Embodiments of this application provide a data transmission method, an apparatus, and a device in a Wi-Fi network, to identify and preferably forward a downlink packet of a preset service type. This can resolve a problem that although a high forwarding priority is set in a downlink packet, preferable forwarding is actually not implemented, so that reliability of providing differentiated data transmission services by a network access device is improved.

To achieve the foregoing objective, embodiments of this application provide the following technical solutions.

According to a first aspect, a data transmission method in a Wi-Fi network is provided. The method is applied to a network access device (for example, a router). The method includes: receiving an uplink packet; recording a real-time transmission indication and uplink 5-tuple information that are carried in the uplink packet; then, receiving a downlink packet, where the downlink packet carries downlink 5-tuple information; and then, if a service type of the downlink packet is a preset service type, and the downlink 5-tuple information matches the uplink 5-tuple information, preferably forwarding the downlink packet based on the real-time transmission indication.

According to the data transmission method in the Wi-Fi network provided in this application, the network access device records the real-time transmission indication and the uplink 5-tuple information that are carried in the uplink packet. When the service type of the downlink packet is the preset service type, the network access device may preferably forward, based on the real-time transmission indication of the uplink packet, the downlink packet whose downlink 5-tuple information matches the uplink 5-tuple information. When a high forwarding priority that is set by an external network device such as a server for the downlink packet of the preset service type is ignored, tampered with, or randomly used, the downlink packet that matches the uplink 5-tuple can still be preferably forwarded based on the real-time transmission indication of the uplink packet. Therefore, an objective of preferably forwarding the downlink packet of the preset service type is achieved, and reliability of providing a differentiated data transmission services by the network access device can be improved.

For example, the real-time transmission indication may include one or more of the following: a differentiated services code point DSCP value corresponding to a highest forwarding priority, a user priority UP value corresponding to the highest forwarding priority, and an access category AC corresponding to the highest forwarding priority.

For example, the downlink 5-tuple information may include a downlink source internet protocol IP address, a downlink destination IP address, a downlink source port, a downlink destination port, and a downlink transmission protocol type. Correspondingly, that the service type of the downlink packet is the preset service type may include: The downlink packet meets at least one of the following conditions: The downlink source IP address is a source IP address that provides a real-time transmission service. The downlink source port is a source port that provides a real-time transmission service. The downlink transmission protocol type is a transmission protocol type used for the real-time transmission service. A bandwidth occupied by the downlink packet is less than a downlink bandwidth threshold. A packet length of the downlink packet is less than a downlink packet length threshold. A deviation between arrival times of any two adjacent downlink packets is less than a downlink time deviation threshold.

For example, the uplink 5-tuple information may include an uplink source internet protocol IP address, an uplink destination IP address, an uplink source port, an uplink destination port, and an uplink transmission protocol type.

Correspondingly, that the downlink 5-tuple information matches the uplink 5-tuple information may include: The downlink source IP address is the same as the uplink destination IP address. The downlink destination IP address is the same as the uplink source IP address. The downlink source port is the same as the uplink destination port. The downlink destination port is the same as the uplink source port. The downlink transmission protocol type is the same as the uplink transmission protocol type.

In a possible design method, before the preferably forwarding the downlink packet based on the real-time transmission indication is performed, the data transmission method in the Wi-Fi network according to the first aspect may further include one or more of the following: determining that a downlink data volume is greater than a downlink data volume threshold; and determining that the downlink bandwidth is greater than the downlink bandwidth threshold.

In a possible design method, the data transmission method in the Wi-Fi network may further include: not preferably forwarding a downlink packet that corresponds to the uplink 5-tuple information and/or the downlink 5-tuple information and that does not appear within a specified time period.

In another possible design method, the data transmission method in the Wi-Fi network may further include: limiting a downlink packet bandwidth of a first specified station STA.

Optionally, the limiting a downlink packet bandwidth of a first specified station STA may include at least one of the following: limiting an amount of uplink 5-tuple information and/or downlink 5-tuple information corresponding to a downlink packet preferably forwarded to the first specified station STA; limiting a quantity of downlink packets preferably forwarded to the first specified station STA; or limiting a continuous transmission time occupied by a downlink packet preferably forwarded to the first specified station STA.

Optionally, the limiting a downlink packet bandwidth of a first specified station STA may include: limiting the downlink packet bandwidth of the first specified station STA when preferably forwarding a downlink packet to a second specified station STA.

According to a second aspect, another data transmission method in a Wi-Fi network is provided. The method is applied to a network access device. The method includes: receiving an uplink packet, where the uplink packet carries a real-time transmission indication and uplink 5-tuple information; then, receiving a downlink packet; and if a service type of the uplink packet is a preset service type, and downlink 5-tuple information matches the uplink 5-tuple information, preferably forwarding the downlink packet based on the real-time transmission indication, where the downlink packet carries the downlink 5-tuple information.

According to the data transmission method in the Wi-Fi network provided in this application, the network access device receives and records the real-time transmission indication and the uplink 5-tuple information that are carried in the uplink packet. If the service type of the uplink packet is the preset service type, the network access device may preferably forward, based on the real-time transmission indication of the uplink packet, the downlink packet whose downlink 5-tuple information matches the uplink 5-tuple information. When a high priority that is set by an external network device such as a server for the downlink packet is ignored, tampered with, or randomly used, the downlink packet that matches the uplink 5-tuple can still be preferably forwarded based on the real-time transmission indication of the uplink packet. Therefore, an objective of preferably forwarding the downlink packet of the preset service type is achieved, and reliability of providing a differentiated data transmission services by the network access device can be improved.

For example, the real-time transmission indication may include one or more of the following: a differentiated services code point DSCP value corresponding to a highest forwarding priority, a user priority UP value corresponding to the highest forwarding priority, and an access category AC corresponding to the highest forwarding priority.

For example, the uplink 5-tuple information may include: an uplink source internet protocol IP address, an uplink destination IP address, an uplink source port, an uplink destination port, and an uplink transmission protocol type. Correspondingly, that the service type of the uplink packet is the preset service type may include: The service type of the uplink packet is the preset service type if the uplink packet meets at least one of the following conditions: The uplink destination IP address is a destination IP address that provides a real-time transmission service. The uplink destination port is a destination port that provides the real-time transmission service. The uplink transmission protocol type is a transmission protocol type used for the real-time transmission service. A bandwidth occupied by the uplink packet is less than an uplink bandwidth threshold. A packet length of the uplink packet is less than an uplink packet length threshold.

For example, the downlink 5-tuple information may include a downlink source internet protocol IP address, a downlink destination IP address, a downlink source port, a downlink destination port, and a downlink transmission protocol type. Correspondingly, that the downlink 5-tuple information matches the uplink 5-tuple information may include: The downlink source IP address is the same as the uplink destination IP address. The downlink destination IP address is the same as the uplink source IP address. The downlink source port is the same as the uplink destination port. The downlink destination port is the same as the uplink source port. The downlink transmission protocol type is the same as the uplink transmission protocol type.

In a possible design method, before the preferably forwarding the downlink packet based on the real-time transmission indication is performed, the data transmission method in the Wi-Fi network according to the second aspect may further include one or more of the following: determining that a downlink data volume is greater than a downlink data volume threshold; and determining that a downlink bandwidth is greater than a downlink bandwidth threshold.

In a possible design method, the data transmission method in the Wi-Fi network according to the second aspect may further include: not preferably forwarding a downlink packet that corresponds to the uplink 5-tuple information and/or the downlink 5-tuple information and that does not appear within a specified time period.

In another possible design method, the data transmission method in the Wi-Fi network according to the second aspect may further include: limiting a downlink packet bandwidth of a first specified station STA.

Optionally, the limiting a downlink packet bandwidth of a first specified station STA may include at least one of the following: limiting an amount of uplink 5-tuple information and/or downlink 5-tuple information corresponding to a downlink packet preferably forwarded to the first specified station STA; limiting a quantity of downlink packets preferably forwarded to the first specified station STA; limiting a continuous transmission time occupied by a downlink packet preferably forwarded to the first specified station STA; or limiting the downlink packet bandwidth of the first specified station STA when preferably forwarding a downlink packet to a second specified station STA.

It should be noted that the data transmission method in the Wi-Fi network provided in the first aspect and the data transmission method in the Wi-Fi network provided in the second aspect may be separately used, or may be used in combination. For example, the downlink packet may be preferably forwarded based on the real-time transmission indication of the uplink packet only when both the service type of the uplink packet and the service type of the downlink packet are the preset service type and the uplink 5-tuple matches the downlink 5-tuple, so as to further improve accuracy and efficiency of identifying and forwarding a high-priority downlink packet.

According to a third aspect, still another data transmission method in a Wi-Fi network is provided. The method is applied to a network access device. The method includes: receiving a downlink packet, where the downlink packet carries downlink 5-tuple information, and the downlink 5-tuple information includes a downlink source internet protocol IP address, a downlink destination IP address, a downlink source port, a downlink destination port, and a downlink transmission protocol type. Then, preferably forwarding the downlink packet if it is determined that a service type of the downlink packet is a preset service type. That a service type of the downlink packet is a preset service type may include: The service type of the downlink packet is the preset service type if the downlink packet meets at least one of the following conditions: The downlink source IP address is a source IP address that provides a real-time transmission service. The downlink source port is a source port that provides the real-time transmission service. The downlink transmission protocol type is a transmission protocol type used for the real-time transmission service. A bandwidth occupied by the downlink packet is less than a downlink bandwidth threshold. A packet length of the downlink packet is less than a downlink packet length threshold. A deviation between arrival times of any two adjacent downlink packets is less than a downlink time deviation threshold.

According to the data transmission method in the Wi-Fi network provided in this application, the network access device can identify and preferably forward the downlink packet of the preset service type. This can resolve a problem that when a high priority that is set by an external network device such as a server for a downlink packet is ignored, tampered with, or randomly used, the network access device cannot preferably forward the downlink packet of the preset service type, so that reliability of providing differentiated data transmission services by the network access device is improved.

According to a fourth aspect, a communications apparatus in a Wi-Fi network is provided. The communications apparatus includes a processing module, a first transceiver module, and a second transceiver module. The first transceiver module is configured to receive an uplink packet, where the uplink packet carries a real-time transmission indication and uplink 5-tuple information. The second transceiver module is configured to receive a downlink packet, where the downlink packet carries downlink 5-tuple information. The processing module is configured to: if a service type of the downlink packet is a preset service type, and the downlink 5-tuple information matches the uplink 5-tuple information, control the first transceiver module to preferably forward the downlink packet based on the real-time transmission indication.

For example, the real-time transmission indication may include one or more of the following: a differentiated services code point DSCP value corresponding to a highest forwarding priority, a user priority UP value corresponding to the highest forwarding priority, and an access category AC corresponding to the highest forwarding priority.

For example, the downlink 5-tuple information includes a downlink source internet protocol IP address, a downlink destination IP address, a downlink source port, a downlink destination port, and a downlink transmission protocol type. Correspondingly, that a service type of the downlink packet is a preset service type includes: The downlink packet meets at least one of the following conditions: The downlink source IP address is a source IP address that provides a real-time transmission service. The downlink source port is a source port that provides the real-time transmission service. The downlink transmission protocol type is a transmission protocol type used for the real-time transmission service. A bandwidth occupied by the downlink packet is less than a downlink bandwidth threshold. A packet length of the downlink packet is less than a downlink packet length threshold. A deviation between arrival times of any two adjacent downlink packets is less than a downlink time deviation threshold.

For example, the uplink 5-tuple information includes an uplink source internet protocol IP address, an uplink destination IP address, an uplink source port, an uplink destination port, and an uplink transmission protocol type. Correspondingly, that the downlink 5-tuple information matches the uplink 5-tuple information includes: The downlink source IP address is the same as the uplink destination IP address. The downlink destination IP address is the same as the uplink source IP address. The downlink source port is the same as the uplink destination port. The downlink destination port is the same as the uplink source port. The downlink transmission protocol type is the same as the uplink transmission protocol type.

In a possible design method, the processing module is further configured to: before that the processing module controls the first transceiver module to preferably forward the downlink packet based on the real-time transmission indication, determine that a downlink data volume is greater than a downlink data volume threshold, or determine that the downlink bandwidth is greater than the downlink bandwidth threshold.

In a possible design method, the processing module is further configured to determine not to preferably forward a downlink packet that corresponds to the uplink 5-tuple information and/or the downlink 5-tuple information and that does not appear within a specified time period.

In another possible design method, the processing module is further configured to limit a downlink packet bandwidth of a first specified station STA.

For example, the limiting a downlink packet bandwidth of a first specified station STA may include one or more of the following: limiting an amount of uplink 5-tuple information and/or downlink 5-tuple information corresponding to a downlink packet preferably forwarded to the first specified station STA; limiting a quantity of downlink packets preferably forwarded to the first specified station STA; limiting a continuous transmission time occupied by a downlink packet preferably forwarded to the first specified station STA; or limiting the downlink packet bandwidth of the first specified station STA when preferably forwarding a downlink packet to a second specified station STA.

According to a fifth aspect, another communications apparatus in a Wi-Fi network is provided. The communications apparatus includes a processing module, a first transceiver module, and a second transceiver module. The first transceiver module is configured to receive an uplink packet, where the uplink packet carries a real-time transmission indication and uplink 5-tuple information. The second transceiver module is configured to receive a downlink packet, where the downlink packet carries downlink 5-tuple information. The processing module is configured to: if a service type of the uplink packet is a preset service type, and the downlink 5-tuple information matches the uplink 5-tuple information, control the first transceiver module to preferably forward the downlink packet based on the real-time transmission indication.

For example, the real-time transmission indication may include one or more of the following: a differentiated services code point DSCP value corresponding to a highest forwarding priority, a user priority UP value corresponding to the highest forwarding priority, and an access category AC corresponding to the highest forwarding priority.

For example, an uplink source internet protocol IP address, an uplink destination IP address, an uplink source port, an uplink destination port, and an uplink transmission protocol type. Correspondingly, that a service type of the uplink packet is a preset service type may include:

The service type of the uplink packet is the preset service type if the uplink packet meets at least one of the following conditions: The uplink destination IP address is a destination IP address that provides a real-time transmission service. The uplink destination port is a destination port that provides the real-time transmission service. The uplink transmission protocol type is a transmission protocol type used for the real-time transmission service. A bandwidth occupied by the uplink packet is less than an uplink bandwidth threshold. A packet length of the uplink packet is less than an uplink packet length threshold.

For example, the downlink 5-tuple information includes a downlink source internet protocol IP address, a downlink destination IP address, a downlink source port, a downlink destination port, and a downlink transmission protocol type. Correspondingly, that the downlink 5-tuple information matches the uplink 5-tuple information includes: The downlink source IP address is the same as the uplink destination IP address. The downlink destination IP address is the same as the uplink source IP address. The downlink source port is the same as the uplink destination port. The downlink destination port is the same as the uplink source port. The downlink transmission protocol type is the same as the uplink transmission protocol type.

In a possible design method, the processing module is further configured to: before controlling the first transceiver module to preferably forward the downlink packet based on the real-time transmission indication, determine that a downlink data volume is greater than a downlink data volume threshold, or determine that a downlink bandwidth is greater than a downlink bandwidth threshold.

In a possible design method, the processing module is further configured to determine not to preferably forward a downlink packet that corresponds to the uplink 5-tuple information and/or the downlink 5-tuple information and that does not appear within a specified time period.

In another possible design method, the processing module is further configured to limit a downlink packet bandwidth of a first specified station STA.

For example, the limiting a downlink packet bandwidth of a first specified station STA may include at least one of the following: limiting an amount of uplink 5-tuple information and/or downlink 5-tuple information corresponding to a downlink packet preferably forwarded to the first specified station STA; limiting a quantity of downlink packets preferably forwarded to the first specified station STA; or limiting a continuous transmission time occupied by a downlink packet preferably forwarded to the first specified station STA.

Optionally, the processing module is further configured to limit the downlink packet bandwidth of the first specified station STA when controlling a transceiver module to preferably forward a downlink packet of a second specified station STA.

According to a sixth aspect, still another communications apparatus in a Wi-Fi network is provided. The communications apparatus includes a processing module, a first transceiver module, and a second transceiver module. The second transceiver module is configured to receive a downlink packet. The processing module is configured to: if a service type of the downlink packet is a preset service type, control the first transceiver module to preferably forward the downlink packet.

For example, the downlink packet carries a downlink source internet protocol IP address, a downlink destination IP address, a downlink source port, a downlink destination port, and a downlink transmission protocol type. Correspondingly, the processing module is further configured to: if the downlink packet meets at least one of the following conditions, determine that the service type of the downlink packet is the preset service type: The downlink source IP address is a source IP address that provides a real-time transmission service. The downlink source port is a source port that provides the real-time transmission service. The downlink transmission protocol type is a transmission protocol type used for the real-time transmission service. A bandwidth occupied by the downlink packet is less than a downlink bandwidth threshold. A packet length of the downlink packet is less than a downlink packet length threshold. A deviation between arrival times of any two adjacent downlink packets is less than a downlink time deviation threshold.

According to a seventh aspect, a communications apparatus is provided. The communications apparatus includes: a processing module (which may be a processing system), a first transceiver module (which may be one or more interfaces for interacting with a device (for example, a mobile terminal in a home network) in an internal network), and a second transceiver module (which may be one or more interfaces for interacting with a device (for example, a network side device) in an external network). The processing module is configured to perform the data transmission method in the Wi-Fi network according to any one of the possible implementations of the first aspect to the third aspect.

Optionally, the communications apparatus according to the seventh aspect further includes a storage module. The storage module is configured to store an instruction. A processing module is configured to execute the instruction stored in the storage module, so that the communications apparatus performs the data transmission method in the Wi-Fi network according to any one of the possible implementations of the first aspect to the third aspect.

For example, the communications apparatus according to the seventh aspect may be a chip or a chip system.

It should be noted that the communications apparatus according to the seventh aspect may be the communications apparatus according to the fourth aspect, the fifth aspect, or the sixth aspect (for example, a router), or may be a chip or a chip system disposed in the communications apparatus. This is not limited in this application.

According to an eighth aspect, a network access device (for example, a router) is provided. The network access device includes a processor and a memory. The memory is configured to store an instruction. The processor is configured to execute the instruction stored in the memory, so that the network access device performs the data transmission method in the Wi-Fi network according to any one of the possible implementations of the first aspect to the third aspect.

According to a ninth aspect, another network access device (for example, a router) is provided. The network access device includes a processor, a memory, a first transceiver, and a second transceiver. The first transceiver is configured to receive an uplink packet. The second transceiver is configured to receive a downlink packet. The first transceiver is further configured to forward the downlink packet. The memory is configured to store an instruction. The processor is configured to execute the instruction in the memory, so that the network access device performs the data transmission method in the Wi-Fi network according to any one of the possible implementations of the first aspect to the third aspect.

According to a tenth aspect, a communications system is provided. The communications system includes one or more terminals and the foregoing network access device.

According to an eleventh aspect, a computer program product is provided. The computer program product includes a computer program. When the computer program is executed on a computer, the computer is enabled to perform the data transmission method in the Wi-Fi network according to any one of the possible implementations of the first aspect to the third aspect.

According to a twelfth aspect, a computer-readable storage medium is provided. The computer-readable storage medium stores a computer program. When the computer program is executed on a computer, the computer is enabled to perform the data transmission method in the Wi-Fi network according to any one of the possible implementations of the first aspect to the third aspect.

DESCRIPTION OF EMBODIMENTS

The following describes technical solutions in this application with reference to accompanying drawings.

The technical solutions in the embodiments of this application may be applied to various communications systems, for example, a next-generation Wi-Fi system, a 5th generation (5th generation, 5G) mobile communications system, and a future communications system such as a 6th generation (6th generation, 6G) system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in the embodiments of this application, terms such as "for example" and "such as" are used to represent giving an example, an illustration, or a description. Any embodiment or design scheme described as an "example" in this application should not be explained as being more preferred or having more advantages than another embodiment or design scheme. Exactly, "for example" is used to present a concept in a specific manner.

In the embodiments of this application, terms "information (information)", "signal (signal)", "message (message)", "channel (channel)", and "signaling (singalling)" may be interchangeably used sometimes. It should be noted that meanings expressed by the terms are consistent when differences between the terms are not emphasized. Terms "of (of)", "corresponding, relevant (corresponding, relevant)", and "corresponding (corresponding)" may be interchangeably used sometimes. It should be noted that meanings expressed by the terms are consistent when differences between the terms are not emphasized.

In the embodiments of this application, sometimes a subscript such as $W_1$ may be written in an incorrect form such as W1. Meanings expressed by the two are consistent when differences between the two are not emphasized.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of new service scenarios, the technical solutions provided in the embodiments of this application are also applicable to similar technical problems.

In the embodiments of this application, some scenarios are described by using a scenario in a Wi-Fi system as an example. It should be noted that the solutions in the embodiments of this application may also be applied to another mobile communications system, and a corresponding name may also be replaced with a name of a corresponding function in the another mobile communications system.

The term "transceiver" or "transceiver module" in this application may be specifically a communications interface that can receive and send a signal or data.

Figure 1:
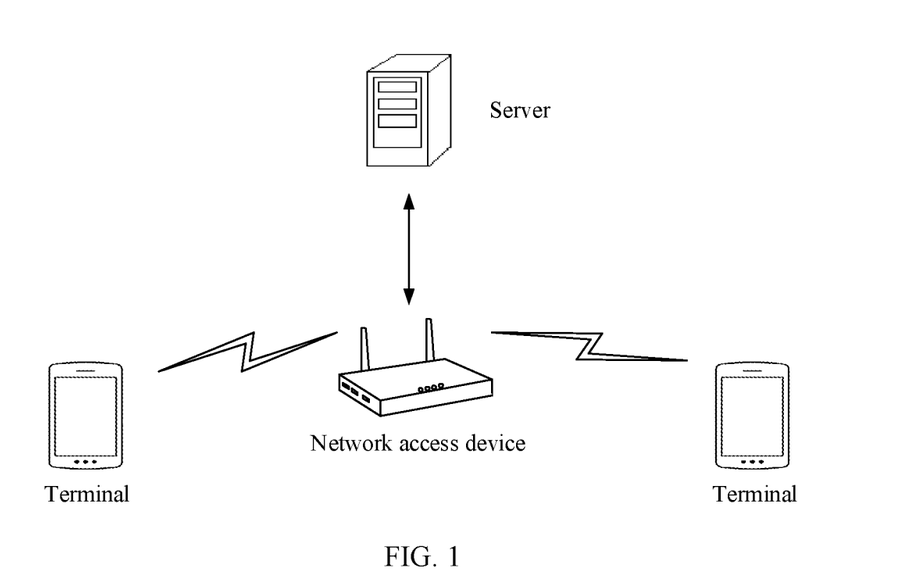
FIG. 1 is a schematic structural diagram of a communications system according to an embodiment of this application.

For ease of understanding of the embodiments of this application, a communications system shown in FIG. 1 is first used as an example to describe in detail a communications system applicable to the embodiments of this application.

As shown in FIG. 1, the communications system includes one or more terminals, a network access device and a server. The terminal may access an external network through the network access device, for example, the server in the external network shown in FIG. 1, to receive a service provided by the external network, such as voice, video playback, web browsing, downloading, or games. The network access device usually includes a transceiver module, for example, a Wi-Fi module, and may provide a data forwarding service for the terminal, for example, forward, to the external network, an uplink packet for which the terminal is used as a source device, and/or forward, to the terminal, a downlink packet for which the terminal is used as a destination device. In addition, the network access device may further include a scheduling module. The scheduling module is configured to determine an uplink packet and/or a downlink packet, to determine whether to accelerate transmission of a downlink packet, and a downlink packet whose transmission is to be accelerated. That is, the scheduling module may provide differentiated data transmission services for different types of downlink packets.

The network access device is a device that is located on a network side of the communications system and that has a wireless transceiver function, or a chip that can be disposed in the device. The network access device includes but is not limited to: an access point (access point, AP), an evolved NodeB (evolved Node B, eNB), a radio network controller (radio network controller, RNC), a NodeB (Node B, NB), a base station controller (base station controller, BSC), a base transceiver station (base transceiver station, BTS), a home eNodeB (for example, home evolved NodeB, or home Node B, HNB), a baseband unit (baseband unit, BBU), a wireless relay node, a wireless backhaul node, a transmission point (transmission and reception point, TRP or transmission point, TP), or the like in a Wi-Fi system, or may be a gNB or a transmission point (TRP or TP) in a 5G system such as a new radio (new radio, NR) system, or one or a group of antenna panels (including a plurality of antenna panels) of a base station in a 5G system, or may be a network node that forms a gNB or a transmission point, for example, a baseband unit (BBU), or a distributed unit (distributed unit, DU).

In some deployments, the gNB may include a centralized unit (centralized unit, CU) and the DU. The gNB may further include a radio unit (radio unit, RU). The CU implements some functions of the gNB, and the DU implements some functions of the gNB. For example, the CU implements functions of a radio resource control (radio resource control, RRC) layer and a packet data convergence protocol (packet data convergence protocol, PDCP) layer, and the DU implements functions of a radio link control (radio link control, RLC) layer, a media access control (media access control, MAC) layer, and a physical (physical, PHY) layer. Information at the RRC layer finally becomes information at the PHY layer, or is converted from information at the PHY layer. Therefore, in this architecture, higher layer signaling, for example, RRC layer signaling or PHCP layer signaling, may also be considered as being sent by the DU or by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

The terminal is a terminal device that accesses the communications system and that has a wireless transceiver function, or a chip that can be disposed on the terminal device. The terminal device may also be referred to as user equipment (user equipment, UE), a user apparatus, an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone (mobile phone), a tablet (Pad), a computer having the wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like.

It should be understood that FIG. 1 is merely a simplified schematic diagram used as an example for ease of understanding. The communications system may further include another network device or another terminal device that is not shown in FIG. 1.

With reference to the accompanying drawings, the following describes in detail a data transmission method, an apparatus, and a device in a Wi-Fi network that are provided in the embodiments of this application.

Figure 2:
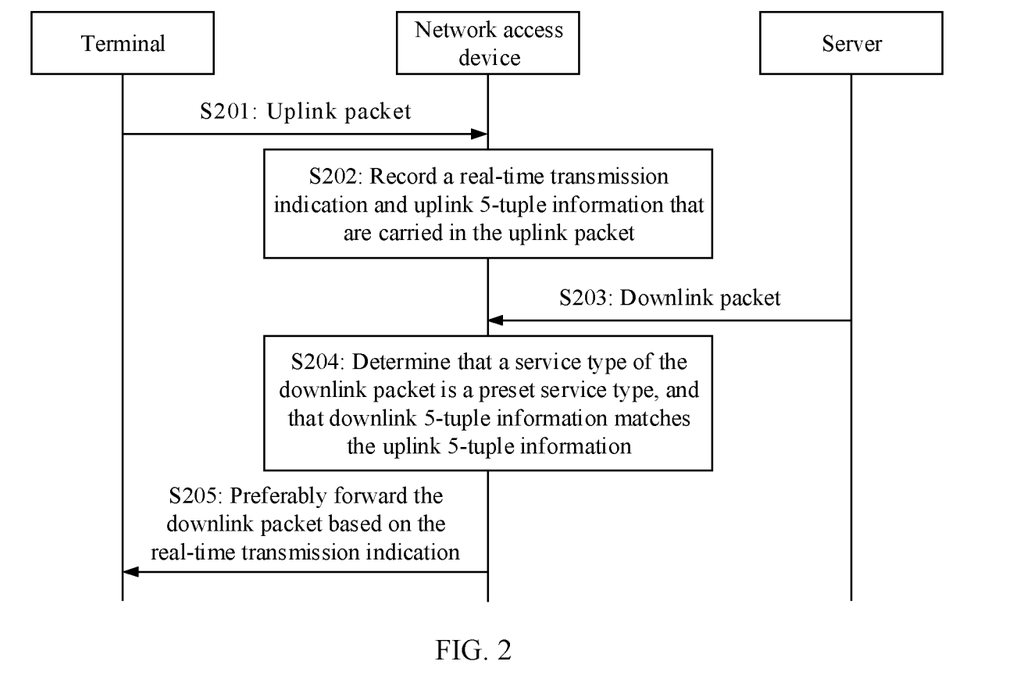
FIG. 2 is a schematic flowchart of a data transmission method in a Wi-Fi network according to an embodiment of this application.

FIG. 2 is a schematic flowchart of a data transmission method in a Wi-Fi network according to an embodiment of this application. The method is applicable to communication between the terminal and the network access device in the communications system shown in FIG. 1. As shown in FIG. 2, the data transmission method in the Wi-Fi network includes the following steps.

S201: The network access device receives an uplink packet.

For example, the network access device may receive, through a wireless connection between the network access device and the terminal, for example, a wireless connection in a Wi-Fi system or an uplink (uplink) in a cellular network, an uplink packet sent by the terminal. The uplink packet may carry uplink 5-tuple information. For example, the uplink 5-tuple information may include an uplink source internet protocol (internet protocol, IP) address, an uplink destination IP address, an uplink source port, an uplink destination port, and an uplink transmission protocol type. The uplink source IP address and the uplink source port may be an IP address and a port number of the terminal, the uplink destination IP address and the uplink destination port may be an IP address and a port number of a server, and the uplink transmission protocol type may be a transmission protocol type used for the uplink packet, such as a user datagram protocol (user data gram protocol, UDP) or a transmission control protocol (transmission control protocol, TCP).

Optionally, the uplink packet may further carry a real-time transmission indication that is set by a user. The real-time transmission indication is used to indicate the network access device to preferably forward downlink packets of one or more service types that are set by the user.

Table 1 shows an example of a forwarding priority mapping relationship specified in an existing WMM protocol. As shown in Table 1, the second column to the fourth column are successively a differentiated services code point (differentiated services codepoint, DSCP), a user priority (user priority, UP) defined in 802.11e, and an access category AC. For example, referring to the access category AC, a video stream and an audio stream are service types that need to be preferably forwarded. A forwarding priority of the audio stream is higher than that of the video stream. Correspondingly, user priority values of the video stream and the audio stream are 4-5 and 6-7 respectively, and DSCP values of the video stream and the audio stream are 32-47 and 48-63 respectively. It is easy to understand that the network access device may parse one or more of a DSCP value, a UP value, and an AC value carried in a packet, to provide differentiated data transmission services for different users or service types.

For example, in the existing WMM protocol, a game service is considered as the video stream, and a forwarding priority of the game service is lower than that of the audio stream. Therefore, for a game user, when there are a relatively large quantity of downlink packets of a voice stream, or a downlink bandwidth usage of a video stream other than the game service, such as video playback, is relatively high, because the forwarding priority of the game service is lower than that of the voice stream and is the same as that of another video stream, the network access device may not preferably forward a game packet. Consequently, a transmission delay of the game packet is relatively long, problems such as game freezing occur, and user experience is relatively poor.

In this embodiment of this application, a preset service type may be manually set, for example, the real-time transmission indication of the game service that the user is most interested in, that is, a relatively high forwarding priority is set for the preset service type. For example, the user may set the real-time transmission indication in an uplink packet of the preset service type. Specifically, one or more of the following real-time transmission indications may be set in a DSCP field or a ToS field of a header of the uplink packet: a differentiated services code point DSCP value corresponding to a highest forwarding priority, a user priority UP value corresponding to the highest forwarding priority, the access category AC corresponding to the highest forwarding priority, a minimum transmission delay, or the like.

For example, the game user may set, on a game interface of the terminal, a forwarding priority of a downlink packet of the game service to a highest priority, for example, higher than or equal to a forwarding priority of the voice stream. Specifically, the game user may enter the real-time transmission indication on an input interface provided by the terminal, for example, a graphical user interface or a command line input window of the game software. The real-time transmission indication may be a maximum forwarding delay with a relatively small value, for example, 10 milliseconds (millisecond, ms), or 20 ms, or may be a priority value corresponding to the highest forwarding priority. This is not limited in this embodiment of this application.

TABLE 1

| Priority | DSCP | UP | AC | Definition |
| --- | --- | --- | --- | --- |
| In ascending | 0-7 | 1 | AC_BK | Background data |
| order of | 8-15 | 2 | AC_BK | Background data |
| priorities from | 16-23 | 0 | AC_BE | Best effort |
| top to bottom | 24-31 | 3 | AC_BE | Best effort |
| | 32-39 | 4 | AC_VI | Video |
| | 40-47 | 5 | AC_VI | Video |
| | 48-55 | 6 | AC_VO | Audio |
| | 56-63 | 7 | AC_VO | Audio |

In addition, the uplink packet may further carry information such as a packet length and a sending time of the uplink packet.

S202: The network access device records the real-time transmission indication and the uplink 5-tuple information that are carried in the uplink packet.

For example, the network access device may record the real-time transmission indication and the uplink 5-tuple information in local storage space of an access network, for example, in a packet forwarding table of the network access device or in a configuration file that may be invoked by a control program of the access network. This is not limited in this embodiment of this application.

In addition, the network access device may further obtain statistics information of an uplink packet from a specified terminal. For example, the network access device may parse a sending time carried in the uplink packet, and calculate a transmission delay of the uplink packet from the terminal to the network access device with reference to a receiving time at which the network access device receives the uplink packet. It is easy to understand that the network access device may further collect statistics about a packet length and a quantity of the uplink packet from the specified terminal within a specified time period, and calculate a transmission bandwidth occupied by the specified terminal.

S203: The network access device receives a downlink packet. The downlink packet carries downlink 5-tuple information.

For example, the network access device may receive, through a communications connection to an external network such as a server in the external network, for example, a communications cable includes an optical fiber, a network cable, or the like, and/or a network route of an intermediate node, a downlink packet sent by the external network. The downlink 5-tuple information may include a downlink source internet protocol IP address, a downlink destination IP address, a downlink source port, a downlink destination port, and a downlink transmission protocol type. The downlink source IP address and the downlink source port may be a device in the external network, for example, an IP address and a port number of the server. The downlink destination IP address and the downlink destination port may be an IP address and a port number of the terminal. The downlink transmission protocol type may be a network transmission protocol type used for the downlink packet, such as a UDP protocol or a TCP protocol.

It should be noted that the uplink packet and the downlink packet may use a same transmission protocol type, or may use different transmission protocol types. This is not limited in this embodiment of this application.

In addition, the network access device may further obtain statistics information of downlink packets from the external network, for example, a specified server. For example, the network access device may parse a sending time carried in the downlink packet, and calculate a transmission delay of the information packet from the external network to the network access device with reference to a receiving time at which the network access device receives the information packet. It is easy to understand that the network access device may further collect statistics about a packet length and a quantity of the downlink packet from the specified server within a specified time period, and calculate a transmission bandwidth occupied by the downlink packet.

S204: The network access device determines that a service type of the downlink packet is the preset service type, and that the downlink 5-tuple information matches the uplink 5-tuple information.

In this embodiment of this application, the preset service type may be manually set by the user. For example, the game user sets, by using a setting button in a graphical user interface of an online game installed in the terminal, the online game to the preset service type. For another example, a network novel user may set, by using a setting button in a graphical user interface of a network novel application program installed in the terminal, the network novel to the preset service type.

Specifically, the preset service type may be set based on at least one of the following parameters: an IP address of a network device that provides a service of the preset service type, a port number, a used transmission protocol type, an occupied uplink/downlink bandwidth, a packet length, an arrival time deviation, and the like. Correspondingly, the network access device may receive the foregoing parameter that is of the preset service type and that is set by the terminal, and determine, based on the foregoing parameter, statistical information of the network access device, a bandwidth occupied by the downlink packet, a transmission delay, QoS information, and the like, whether the service type of the received downlink packet is the preset service type.

For example, using a game as an example, the determining that a service type of the downlink packet is the preset service type may include the following step:

It is determined that the service type of the downlink packet is the preset service type if the downlink packet meets at least one of the following conditions:

The downlink source IP address is a source IP address that provides a real-time transmission service, for example, an IP address of a game server.

The downlink source port is a source port that provides the real-time transmission service, for example, a sending port number of the game server.

The downlink transmission protocol type is a transmission protocol type used for the real-time transmission service, for example, a transmission protocol type used for the game packet may be the UDP protocol or the TCP protocol.

The bandwidth occupied by the downlink packet is less than a downlink bandwidth threshold. The downlink bandwidth threshold is a relatively small value, for example, less than 0.5 Mbps (mega bits per second, Mbps) or 1 Mbps.

The packet length of the downlink packet is less than a downlink packet length threshold, for example, 100 bytes (bytes, B).

The deviation between arrival times of any two adjacent downlink packets is less than a downlink time deviation threshold, for example, 50 ms or 100 ms, that is, an arrival time interval of the downlink packets is relatively stable.

It is easy to understand that for downlink packets of different preset service types, such as video playback, the foregoing determining conditions may be different. For example, that the bandwidth occupied by the downlink packet is less than a downlink bandwidth threshold may be replaced with the following: the bandwidth occupied by the downlink packet is greater than or equal to another downlink bandwidth threshold. The another downlink bandwidth threshold is usually a relatively large value, for example, 1 Mbps. For another example, the packet length of the downlink packet is greater than or equal to a downlink packet length threshold. The downlink packet length threshold may be 200 bytes, 500 bytes, or the like.

Because a transmission direction of the downlink packet is opposite to a transmission direction of the uplink packet, a service type is preset between a same terminal and a same network device such as a game server in the external network. The source IP address, the source port, the destination IP address, and the destination port of the downlink packet are respectively corresponding to the destination IP address, the destination port, the source IP address, and the source port of the uplink packet that are recorded in S202. Therefore, optionally, that the downlink 5-tuple information matches the uplink 5-tuple information may include:

The downlink source IP address is the same as the uplink destination IP address.

The downlink destination IP address is the same as the uplink source IP address.

The downlink source port is the same as the uplink destination port.

The downlink destination port is the same as the uplink source port.

The downlink transmission protocol type is the same as the uplink transmission protocol type.

S205: The network access device preferably forwards the downlink packet based on the real-time transmission indication.

For example, if it is determined, in S204, that the downlink packet is a packet of the preset service type, and it is determined, in S204, that the downlink 5-tuple information matches the uplink 5-tuple information recorded in S202, it may be determined that the downlink packet is a downlink packet that is of the preset service type and that needs to be preferably forwarded. The downlink packet is preferably forwarded to the terminal based on the real-time transmission indication recorded in S202.

Optionally, the network access device may add, based on the real-time transmission indication that is carried in the uplink packet and that is recorded in S202, the uplink 5-tuple information carried in the uplink packet or the downlink 5-tuple information that matches the uplink 5-tuple information to a local routing and forwarding table of the network access device. When determining that the received downlink packet is of the preset service type and/or that the downlink 5-tuple information carried in the received downlink packet matches the uplink 5-tuple information or the downlink 5-tuple information in the routing and forwarding table, the network access device immediately forwards the downlink packet.

Optionally, the network access device may not modify the routing and forwarding table, but writes the foregoing operation related to preferable forwarding into the control program of the access device in an embedded manner, or write the operation related to preferable forwarding into the configuration file that can be invoked by the control program of the network access device. This is not limited in this embodiment of this application.

It is easy to understand that, when a data volume of the downlink packet that needs to be forwarded by the network access device is relatively small, or the bandwidth occupied by the downlink packet is relatively small, forwarding of the downlink packet of the preset service type is not adversely affected. For example, the transmission delay may still be within an acceptable range, and user experience is not affected. Therefore, to reduce control complexity of the network access device, in a possible design method, before S204 in which the network access device determines that a service type of the downlink packet is the preset service type is performed, the data transmission method in the Wi-Fi network shown in FIG. 2 may further include one or more of the following:

determining that a downlink data volume is greater than a downlink data volume threshold; and determining that the downlink bandwidth is greater than the downlink bandwidth threshold.

In addition, to further reduce the control complexity of the access device, an exit mechanism may also be set for the data transmission method in the Wi-Fi network shown in FIG. 2. Therefore, in a possible design method, the data transmission method in the Wi-Fi network shown in FIG. 2 may further include the following step:

not preferably forwarding a downlink packet that corresponds to the uplink 5-tuple information and/or the downlink 5-tuple information and that does not appear within a specified time period, where the specified time period may be set by the terminal, or may be set by the network access device by default, for example, may be set to 30 minutes, or 1 hour.

It is easy to understand that, when existing resources of the network access device cannot ensure forwarding requirements of all downlink packets, forwarding of some downlink packets may be further limited, so as to ensure forwarding requirements of the other downlink packets. Therefore, in another possible design method, the data transmission method in the Wi-Fi network shown in FIG. 2 may further include the following step:

limiting a downlink packet bandwidth of a first specified station STA.

For example, the limiting a downlink packet bandwidth of a first specified station STA may include at least one of the following:

limiting an amount of uplink 5-tuple information and/or downlink 5-tuple information corresponding to a downlink packet preferably forwarded to the first specified station STA;

limiting a quantity of downlink packets preferably forwarded to the first specified station STA;

limiting a continuous transmission time occupied by a downlink packet preferably forwarded to the first specified station STA; or limiting the downlink packet bandwidth of the first specified station STA when preferably forwarding a downlink packet for a second specified station STA.

According to the data transmission method in the Wi-Fi network provided in this application, the network access device records the real-time transmission indication and the uplink 5-tuple information that are carried in the uplink packet. When the service type of the downlink packet is the preset service type, the network access device may preferably forward, based on the real-time transmission indication of the uplink packet, the downlink packet whose downlink 5-tuple information matches the uplink 5-tuple information. When a high forwarding priority that is set by an external network device such as a server for the downlink packet of the preset service type is ignored, tampered with, or randomly used, the downlink packet that matches the uplink 5-tuple can still be preferably forwarded based on the real-time transmission indication of the uplink packet. Therefore, an objective of preferably forwarding the downlink packet of the preset service type is achieved, and reliability of providing a differentiated data transmission services by the network access device can be improved.

Figure 3:
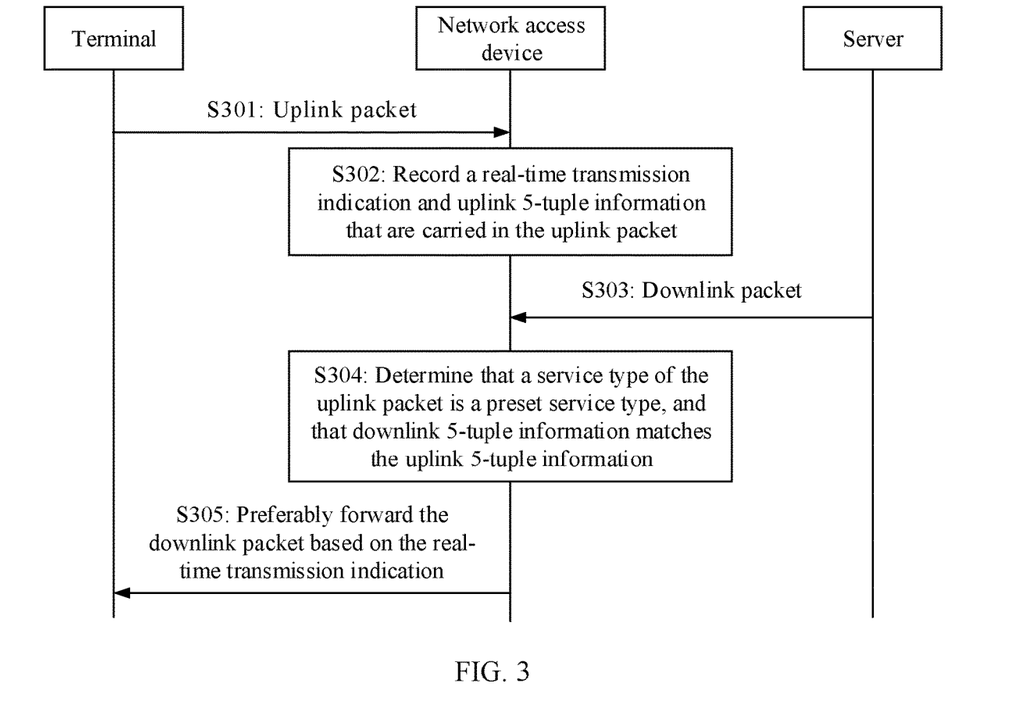
FIG. 3 is another schematic flowchart of a data transmission method in a Wi-Fi network according to an embodiment of this application.

FIG. 3 is another schematic flowchart of a data transmission method in a Wi-Fi network according to an embodiment of this application. The method is applicable to communication between the terminal and the network access device in the communications system shown in FIG. 1. As shown in FIG. 3, the data transmission method in the Wi-Fi network includes the following steps.

S301: The network access device receives an uplink packet. The uplink packet carries a real-time transmission indication and uplink 5-tuple information.

S302: The network access device records the real-time transmission indication and the uplink 5-tuple information that are carried in the uplink packet.

S303: The network access device receives a downlink packet. The downlink packet carries downlink 5-tuple information.

For specific implementations of S301 to S303, respectively refer to S201 to S203. Details are not described herein again.

S304: The network access device determines that a service type of the uplink packet is a preset service type, and that the downlink 5-tuple information matches the uplink 5-tuple information.

For a manner of setting the preset service type, refer to S204. Details are not described herein again.

For example, using a game as an example, the determining that a service type of the uplink packet is the preset service type may include the following step:

It is determined that the service type of the uplink packet is the preset service type if the uplink packet meets at least one of the following conditions:

The uplink destination IP address is a destination IP address that provides a real-time transmission service, for example, an IP address of a game server.

The uplink destination port is a destination port that provides the real-time transmission service, for example, a sending port number of the game server.

The uplink transmission protocol type is a transmission protocol type used for the real-time transmission service, for example, a transmission protocol type used for the game packet may be a UDP protocol or a TCP protocol.

A bandwidth occupied by the uplink packet is less than an uplink bandwidth threshold. The uplink bandwidth threshold is a relatively small value, for example, less than 0.5 Mbps or 1 Mbps.

A packet length of the uplink packet is less than an uplink packet length threshold, for example, 100 bytes.

It is easy to understand that, for uplink packets of different preset service types, the foregoing determining conditions may be different. Specifically, the determining conditions may be set based on service features of the uplink packets of the different preset service types. Details are not described herein again.

It should be noted that S304 may be understood as including two steps: step A of "determining that a service type of the uplink packet is the preset service type", and step B of "determining that the downlink 5-tuple information matches the uplink 5-tuple information". Step A of "determining that a service type of the uplink packet is the preset service type" in S304 may occur at any time point after S301 or before S305, and step A and other steps may be performed in a plurality of sequences. In a possible implementation, step A may be performed immediately after the uplink packet is received in S301, that is, may be performed before S302, or may be performed in a process of performing S302. In this way, "the real-time transmission indication and the uplink 5-tuple information that are carried in the uplink packet and that are recorded" in S302 may be the real-time transmission indication and the uplink 5-tuple information that are carried in the uplink packet that has been determined to be of the preset service type. In this case, a quantity of real-time transmission indications and an amount of uplink 5-tuple information that are carried in the uplink packet and that are recorded in S302 are usually relatively small, so that storage space of the network access device can be saved.

For an implementation of determining that the downlink 5-tuple information matches the uplink 5-tuple information, refer to related descriptions in S204. Details are not described herein again.

S305: The network access device preferably forwards the downlink packet based on the real-time transmission indication.

For a specific implementation of S305, refer to S205. Details are not described herein again.

It is easy to understand that, when a data volume of the downlink packet that needs to be forwarded by the network access device is relatively small, or a bandwidth occupied by the downlink packet is relatively small, forwarding of the downlink packet of the preset service type is not adversely affected. For example, a transmission delay may still be within an acceptable range, and user experience is not affected. Therefore, to reduce control complexity of the network access device, in a possible design method, before preferably forwarding the downlink packet based on the real-time transmission indication, the data transmission method in the Wi-Fi network shown in FIG. 3 may further include one or more of the following:

determining that a downlink data volume is greater than a downlink data volume threshold; and determining that the downlink bandwidth is greater than a downlink bandwidth threshold.

In addition, to further reduce the control complexity of the access device, an exit mechanism may also be set for the data transmission method in the Wi-Fi network shown in FIG. 3. Therefore, in a possible design method, the data transmission method in the Wi-Fi network shown in FIG. 3 may further include the following step:

not preferably forwarding a downlink packet that corresponds to the uplink 5-tuple information and/or the downlink 5-tuple information and that does not appear within a specified time period. The specified time period may be set by the terminal, or may be set by the network access device by default, for example, may be set to 30 minutes, or 1 hour.

It is easy to understand that, when existing resources of the network access device cannot ensure forwarding requirements of all downlink packets, forwarding of some downlink packets may be further limited, so as to ensure forwarding requirements of the other downlink packets. Therefore, in another possible design method, the data transmission method in the Wi-Fi network shown in FIG. 3 may further include:

limiting a downlink packet bandwidth of a first specified station STA.

Optionally, the limiting a downlink packet bandwidth of a first specified station STA may include at least one of the following:

limiting an amount of uplink 5-tuple information and/or downlink 5-tuple information corresponding to a downlink packet preferably forwarded to the first specified station STA;

limiting a quantity of downlink packets preferably forwarded to the first specified station STA;

limiting a continuous transmission time occupied by a downlink packet preferably forwarded to the first specified station STA; or limiting the downlink packet bandwidth of the first specified station STA when preferably forwarding a downlink packet to a second specified station STA.

According to the data transmission method in the Wi-Fi network provided in this application, the network access device determines that the service type of the uplink packet is the preset service type, and records the real-time transmission indication and the uplink 5-tuple information that are carried in the uplink packet. Then, the network access device may preferably forward, based on the real-time transmission indication of the uplink packet, the downlink packet whose downlink 5-tuple information matches the uplink 5-tuple information. When a high priority that is set by an external network device such as a server for the downlink packet is ignored, tampered with, or randomly used, the downlink packet that matches the uplink 5-tuple can still be preferably forwarded based on the real-time transmission indication of the uplink packet. Therefore, an objective of preferably forwarding the downlink packet of the preset service type is achieved, and reliability of providing a differentiated data transmission services by the network access device can be improved.

It should be noted that the data transmission method in the Wi-Fi network shown in FIG. 2 and the data transmission method in the Wi-Fi network shown in FIG. 3 may also be used in combination. For example, the downlink packet may be preferably forwarded based on the real-time transmission indication of the uplink packet only when both the service type of the uplink packet and the service type of the downlink packet are the preset service type and the uplink 5-tuple matches the downlink 5-tuple, so as to further improve accuracy and efficiency of identifying and forwarding a high-priority downlink packet.

In the foregoing data transmission methods in the Wi-Fi network shown in FIG. 2 and FIG. 3, the following manner is used to preferably forward the downlink packet of the preset service type. To be specific, the downlink packet carrying the downlink 5-tuple information that matches the uplink 5-tuple information carried in the uplink packet is preferably forwarded based on the real-time transmission indication carried in the uplink packet. To further simplify design complexity of the network access device, the downlink packet of the preset service type may alternatively be preferably forwarded based only on a traffic characteristic of the downlink packet. The following provides a detailed description with reference to FIG. 4.

Figure 4:
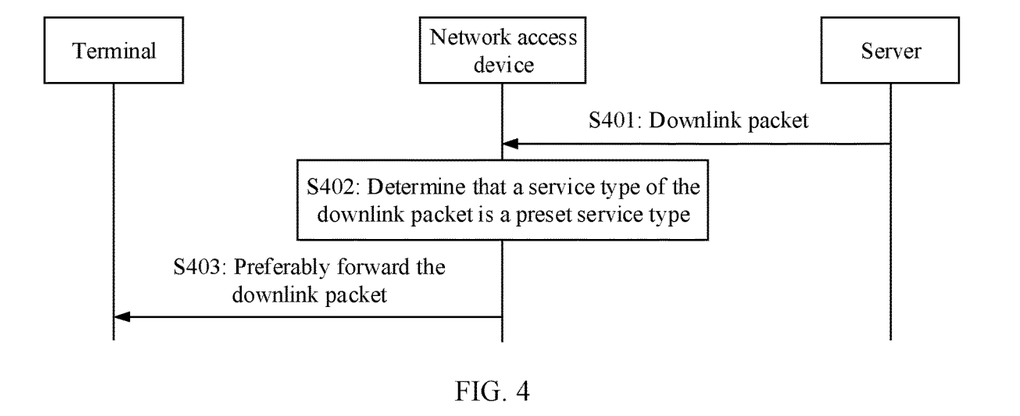
FIG. 4 is still another schematic flowchart of a data transmission method in a Wi-Fi network according to an embodiment of this application.

FIG. 4 is still another schematic flowchart of a data transmission method in a Wi-Fi network according to an embodiment of this application. The method is applicable to communication between the terminal and the network access device in the communications system shown in FIG. 1. As shown in FIG. 4, the data transmission method in the Wi-Fi network includes the following steps:

S401: The network access device receives a downlink packet.

For a specific implementation, refer to S203. Details are not described herein again.

S402: The network access device determines that a service type of the downlink packet is a preset service type.

For a specific implementation, refer to S204. Details are not described herein again.

S403: The network access device preferably forwards the downlink packet.

Specifically, if it is determined, in S402, that the downlink packet is a packet of the preset service type, the downlink packet may be preferably forwarded to a terminal. For example, the foregoing operations related to determining of the preset service type and preferable forwarding may be written into a control program of the access device in an embedded manner, or written into a configuration file that can be invoked by the control program of the network access device. This is not limited in this embodiment of this application.

According to the data transmission method in the Wi-Fi network provided in this application, the network access device can identify and preferably forward the downlink packet of the preset service type. This can resolve a problem that when a high priority that is set by an external network device such as a server for a downlink packet is ignored, tampered with, or randomly used, the network access device cannot preferably forward the downlink packet of the preset service type, so that reliability of providing differentiated data transmission services by the network access device is improved.

Figure 5:
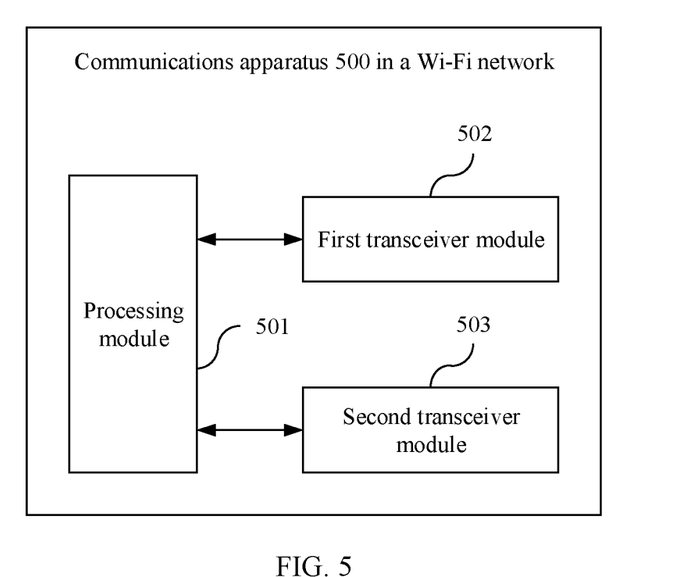
FIG. 5 is a schematic structural diagram of a communications apparatus according to an embodiment of this application.
Figure 6:
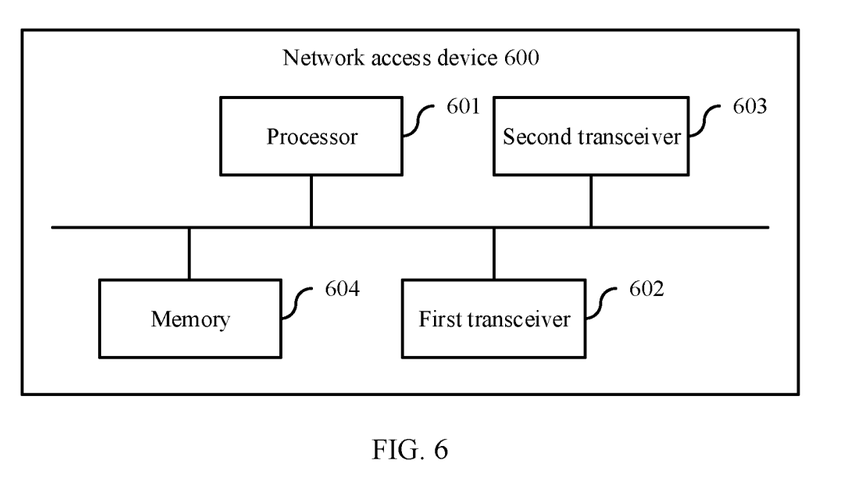
FIG. 6 is a schematic structural diagram of a network access device according to an embodiment of this application.

The data transmission method in the Wi-Fi network provided in the embodiments of this application is described above in detail with reference to FIG. 2 to FIG. 4. With reference to FIG. 5 and FIG. 6, the following describes in detail a communications apparatus in a Wi-Fi network according to the embodiments of this application.

FIG. 5 is a schematic structural diagram of a communications apparatus in a Wi-Fi network according to an embodiment of this application. The communications apparatus is applicable to the communications system shown in FIG. 1, and is configured to perform a function of the network access device in the data transmission method in the Wi-Fi network shown in FIG. 2 or FIG. 3. For ease of description, FIG. 5 shows only main components of the communications apparatus.

As shown in FIG. 5, a communications apparatus 500 in a Wi-Fi network includes: a processing module 501, a first transceiver module 502, and a second transceiver module 503.

The first transceiver module 502 is configured to receive an uplink packet. The uplink packet carries a real-time transmission indication and uplink 5-tuple information.

The second transceiver module 503 is configured to receive a downlink packet. The downlink packet carries downlink 5-tuple information.

The processing module 501 is further configured to: if a service type of the uplink packet or the downlink packet is a preset service type, and the downlink 5-tuple information matches the uplink 5-tuple information, control the first transceiver module 502 to preferably forward the downlink packet based on the real-time transmission indication.

For example, the real-time transmission indication may include one or more of the following: a differentiated services code point DSCP value corresponding to a highest forwarding priority, a user priority UP value corresponding to the highest forwarding priority, and an access category AC corresponding to the highest forwarding priority.

In a possible design, the processing module 501 is further configured to: after the first transceiver module 502 receives the uplink packet, determine whether the service type of the uplink packet is the preset service type. The processing module 501 is further configured to: if the service type of the uplink packet is the preset service type, and the downlink 5-tuple information matches the uplink 5-tuple information, control the first transceiver module 502 to preferably forward the downlink packet based on the real-time transmission indication.

In another possible design, the processing module 501 is further configured to: after the second transceiver module 503 receives the downlink packet, determine whether the service type of the downlink packet is the preset service type. The processing module 501 is further configured to: if the service type of the downlink packet is the preset service type, and the downlink 5-tuple information matches the uplink 5-tuple information, control the first transceiver module 502 to preferably forward the downlink packet based on the real-time transmission indication.

For example, the downlink 5-tuple information includes a downlink source internet protocol IP address, a downlink destination IP address, a downlink source port, a downlink destination port, and a downlink transmission protocol type. Correspondingly, that the service type of the downlink packet is the preset service type may include that the downlink packet meets at least one of the following conditions:

The downlink source IP address is a source IP address that provides a real-time transmission service.

The downlink source port is a source port that provides the real-time transmission service.

The downlink transmission protocol type is a transmission protocol type used for the real-time transmission service.

A bandwidth occupied by the downlink packet is less than a downlink bandwidth threshold.

A length of the downlink packet is less than a downlink packet length threshold. A deviation between arrival times of any two adjacent downlink packets is less than a downlink time deviation threshold.

For example, the uplink 5-tuple information includes an uplink source internet protocol IP address, an uplink destination IP address, an uplink source port, an uplink destination port, and an uplink transmission protocol type. Correspondingly, that the downlink 5-tuple information matches the uplink 5-tuple information includes: The downlink source IP address is the same as the uplink destination IP address. The downlink destination IP address is the same as the uplink source IP address. The downlink source port is the same as the uplink destination port. The downlink destination port is the same as the uplink source port. The downlink transmission protocol type is the same as the uplink transmission protocol type.

In a possible design, the processing module 501 is further configured to: before that the processing module 501 controls the first transceiver module 502 to preferably forward the downlink packet based on the real-time transmission indication, determine that a downlink data volume is greater than a downlink data volume threshold, or determine that the downlink bandwidth is greater than the downlink bandwidth threshold.

In a possible design method, the processing module 501 is further configured to determine not to preferably forward a downlink packet that corresponds to the uplink 5-tuple information and/or the downlink 5-tuple information and that does not appear within a specified time period.

In another possible design method, the processing module 501 is further configured to limit a downlink packet bandwidth of a first specified station STA.

For example, the limiting a downlink packet bandwidth of a first specified station STA may include one or more of the following:

limiting an amount of uplink 5-tuple information and/or downlink 5-tuple information corresponding to a downlink packet preferably forwarded to the first specified station STA; or limiting a quantity of downlink packets preferably forwarded to the first specified station STA; or limiting a continuous transmission time occupied by a downlink packet preferably forwarded to the first specified station STA; or limiting the downlink packet bandwidth of the first specified station STA when preferably forwarding a downlink packet to a second specified station STA.

The communications apparatus 500 in the Wi-Fi network shown in FIG. 5 is also applicable to the communications system shown in FIG. 1, and is configured to perform a function of the network access device in the data transmission method in the Wi-Fi network shown in FIG. 4.

As shown in FIG. 5, the second transceiver module 503 is configured to receive the downlink packet.

The processing module 501 is configured to: if the service type of the downlink packet is the preset service type, control the first transceiver module 502 to preferably forward the downlink packet.

For example, the downlink packet carries a downlink source internet protocol IP address, a downlink destination IP address, a downlink source port, a downlink destination port, and a downlink transmission protocol type. Correspondingly, the processing module 501 is further configured to: if the downlink packet meets at least one of the following conditions, determine that the service type of the downlink packet is the preset service type:

The downlink source IP address is a source IP address that provides a real-time transmission service.

The downlink source port is a source port that provides the real-time transmission service.

The downlink transmission protocol type is a transmission protocol type used for the real-time transmission service.

The bandwidth occupied by the downlink packet is less than the downlink bandwidth threshold.

A length of the downlink packet is less than a downlink packet length threshold. A deviation between arrival times of any two adjacent downlink packets is less than a downlink time deviation threshold.

Optionally, the communications apparatus 500 in the Wi-Fi network shown in FIG. 5 may further include a storage module (not shown in FIG. 5). The storage module is configured to store an instruction. The processing module 501 is further configured to execute the instruction stored in the storage module, so that the communications apparatus 500 in the Wi-Fi network performs the data transmission method in the Wi-Fi network shown in any one of FIG. 2 to FIG. 4.

For example, the communications apparatus 500 in the Wi-Fi network may be the network access device, or may be a chip or a chip system disposed in the network access device. This is not limited in this application.

It should be noted that both the first transceiver module 502 and the second transceiver module 503 may have a wireless local area network (local area network, LAN) interface or a wide area network (wide area network, WAN) interface. An interface type of the first transceiver module 502 and an interface type of the second transceiver module 503 may be the same or different. In an implementation, the first transceiver module 502 has the LAN interface, and the second transceiver module 503 has the WAN interface. In addition, the first transceiver module 502 and the second transceiver module 503 may also simultaneously support a plurality of interface types, for example, both the first transceiver module 502 and the second transceiver module 503 simultaneously support the LAN interface and the WAN interface. The WAN interface is usually used to connect to a device (such as a network side device) in an external network in a wired or wireless manner. The LAN interface is usually used to connect to a device (for example, a mobile terminal in a home network) in an internal network in a wired or wireless manner. When the wireless manner is used, the LAN interface may be a WLAN interface (also referred to as a Wi-Fi interface).

FIG. 6 is a schematic structural diagram of a network access device according to an embodiment of this application. The network access device is applicable to the communications system shown in FIG. 1, and may perform the data transmission method in the Wi-Fi network shown in any one of FIG. 2 to FIG. 4. For ease of description, FIG. 6 shows only main components of the network access device.

As shown in FIG. 6, a network access device 600 includes a processor 601, a first transceiver 602, a second transceiver 603, and a memory 604. The first transceiver 602 is configured to receive an uplink packet. The second transceiver 603 is configured to receive a downlink packet. The first transceiver 602 is further configured to forward the downlink packet. The memory 604 is configured to store an instruction. The processor 601 is configured to execute the instruction stored in the memory 604, so that the network access device 600 performs a function of the network access device in the data transmission method in the Wi-Fi network shown in any one of FIG. 2 to FIG. 4.

It should be noted that the network access device 600 may be the network access device in the foregoing method embodiments, for example, an access point in a Wi-Fi network or a base station in a cellular network system. This is not limited in this application.

The embodiments of this application provide a communications system. The communications system includes one or more terminals and the foregoing network access device.

The embodiments of this application provide a computer-readable storage medium that stores a program or an instruction. When the program or the instruction is run on a computer, the computer is enabled to perform the data transmission method in the Wi-Fi network shown in any one of FIG. 2 to FIG. 4.

The embodiments of this application provide a computer program product, including computer program code. When the computer program code is run on a computer, the computer is enabled to perform the data transmission method in the Wi-Fi network shown in any one of FIG. 2 to FIG. 4.

It should be understood that, the processor in the embodiments of this application may be a central processing unit (central processing unit, CPU). The processor may further be another general purpose processor, a digital signal processor (digital signal processor, DSP), an application specific integrated circuit (application specific integrated circuit, ASIC), a field programmable gate array (field programmable gate array, FPGA), or another programmable logic device, a discrete gate or a transistor logic device, a discrete hardware component, or the like. The general purpose processor may be a microprocessor, or the processor may be any conventional processor or the like.

It should be further understood that the memory in the embodiments of this application may be a volatile memory or a nonvolatile memory, or may include a volatile memory and a nonvolatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. By using examples but not limitative descriptions, many forms of random access memories (random access memory, RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware (for example, a circuit), firmware, or any combination thereof. When the software is used to implement the embodiments, all or some of the foregoing embodiments may be implemented in a form of a computer program product. The computer program product includes one or more computer instructions or computer programs. When the program instructions or the computer programs are loaded or executed on a computer, procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

In this application, the term "and/or" describes an association relationship between associated objects and may indicate three relationships. For example, A and/or B may indicate the following cases: Only A exists, both A and B exist, and only B exists, where A and B may be singular or plural. The character "/" usually indicates an "or" relationship between the associated objects.

In this application, "at least one" refers to one or more, and "a plurality of" refers to two or more. "At least one of the following items (pieces)" or a similar expression thereof refers to any combination of the items, and includes any combination of one item (piece) or a plurality of items (pieces). For example, "at least one of a, b, or c" or "at least one of a, b, and c" may indicate: a, b, c, a-b (that is, a and b), a-c, b-c, or a-b-c, where a, b, and c may be singular or plural.

It should be understood that, in the embodiments of this application, sequence numbers of the foregoing processes do not mean execution sequences. Some or all steps may be executed in parallel or in sequence. The execution sequences of the processes should be determined based on functions and internal logic of the processes, and should not be construed as any limitation on the implementation processes of the embodiments of this application.

A person of ordinary skill in the art may be aware that units and algorithm steps in the examples described with reference to the embodiments disclosed in this specification can be implemented by electronic hardware or a combination of computer software and electronic hardware. Whether the functions are performed by the hardware or the software depends on particular applications and design constraint conditions of the technical solutions. A person skilled in the art may use different methods to implement the described functions for each particular application, but it should not be considered that such an implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division, and there may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device or a terminal device) to perform all or some of the steps of the methods described in the embodiments of this application. The foregoing storage medium includes any medium that can store program code, for example, a USB flash drive, a removable hard disk, a ROM, a RAM, a magnetic disk, or an optical disc.

Related parts of the method embodiments of this application may be mutually referenced. The apparatus provided in each apparatus embodiment is configured to perform the method provided in the corresponding method embodiment. Therefore, each apparatus embodiment may be understood with reference to a related part in a related method embodiment.

Structural diagrams of the apparatuses provided in the apparatus embodiments of this application merely show simplified designs of the corresponding apparatuses. In actual application, the apparatus may include any quantities of transmitters, receivers, processors, memories, and the like, to implement functions or operations performed by the apparatuses in the apparatus embodiments of this application, and all apparatuses that can implement this application fall within the protection scope of this application.

Names of messages/frames/indication information, modules, units, or the like provided in the embodiments of this application are merely examples, and other names may be used provided that the messages/frames/indication information, modules, units, or the like have same functions.

The terms used in the embodiments of this application are merely for the purpose of illustrating specific embodiments, and are not intended to limit the present invention. The terms "a", "an" and "the" of singular forms used in the embodiments of this application and the appended claims are also intended to include plural forms, unless otherwise specified in the context clearly. It should also be understood that, the term "and/or" used in this specification indicates and includes any or all possible combinations of one or more associated listed items. The character "/" in this specification usually indicates an "or" relationship between the associated objects.

Depending on the context, for example, words "if" used herein may be explained as "while" or "when" or "in response to determining" or "in response to detecting". Similarly, depending on the context, phrases "if determining" or "if detecting (a stated condition or event)" may be explained as "when determining" or "in response to determining" or "when detecting (the stated condition or event)" or "in response to detecting (the stated condition or event)".

A person of ordinary skill in the art may understand that all or some of the steps of the method in the foregoing embodiments may be implemented by a program instructing related hardware. The program may be stored in a readable storage medium of a device, such as a FLASH or an EEPROM. When the program is executed, the program performs all or some of the steps described above.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method implemented by a network access device in a wireless local area network, wherein the data transmission method comprises:
    receiving a first uplink packet that carries uplink 5-tuple information, wherein the uplink 5-tuple information comprises an uplink source Internet Protocol (IP) address, an uplink destination IP address, an uplink source port, an uplink destination port, and an uplink transmission protocol type;
    receiving a first downlink packet that carries downlink 5-tuple information, wherein the downlink 5-tuple information comprises a downlink source IP address, a downlink destination IP address, a downlink source port, a downlink destination port, and a downlink transmission protocol type;
    determining whether a service type of the first uplink packet is a preset service type;
    prioritize forwarding the first downlink packet based on a real-time transmission indication when the service type of the first uplink packet is the preset service type and when the downlink 5-tuple information matches the uplink 5-tuple information; and
    not preferably forwarding a second downlink packet that corresponds to the downlink 5-tuple information and is not received within a specified time period,
    wherein the service type is the preset service type when the uplink destination IP address provides a real-time transmission service, the uplink destination port provides the real-time transmission service, the uplink transmission protocol type is used for the real-time transmission service, a bandwidth of the first uplink packet is less than an uplink bandwidth threshold, or a packet length of the first uplink packet is less than an uplink packet length threshold.

2. The data transmission method of claim 1, wherein the real-time transmission indication comprises one or more of a differentiated services code point (DSCP) value corresponding to a highest forwarding priority, a user priority (UP) value corresponding to the highest forwarding priority, or an access category (AC) corresponding to the highest forwarding priority.

3. The data transmission method of claim 1, further comprising:
    adding the uplink 5-tuple information from the first uplink packet to a local routing and forwarding table of the network access device.

4. The data transmission method of claim 1, further comprising limiting a downlink packet bandwidth of a first specified station (STA).

5. The data transmission method of claim 4, further comprising one or more of:
    forwarding a plurality of downlink packets to the first specified STA and limiting a quantity of the downlink packets; or
    forwarding the second downlink packet to the first specified STA and limiting a continuous transmission time of the second downlink packet.

6. The data transmission method of claim 4, further comprising limiting the downlink packet bandwidth when forwarding a third downlink packet to a second specified STA.

7. The data transmission method of claim 1, wherein determining whether the service type of the first uplink packet is the preset service type occurs before receiving the first downlink packet.

8. The data transmission method of claim 1, wherein determining whether the service type of the first uplink packet is the preset service type occurs after receiving the first downlink packet.

9. A communications apparatus, comprising:
    a first transceiver;
    a second transceiver;
    a processor coupled to the first transceiver and the second transceiver and configured to:
        receive a first uplink packet that carries uplink 5-tuple information, wherein the uplink 5-tuple information comprises an uplink source Internet Protocol (IP) address, an uplink destination IP address, an uplink source port, an uplink destination port, and an uplink transmission protocol type;
        receive a first downlink packet, wherein the first downlink packet carries downlink 5-tuple information, and wherein the downlink 5-tuple information comprises a downlink source IP address, a downlink destination IP address, a downlink source port, a downlink destination port, and a downlink transmission protocol type;
        determine whether a service type of the first uplink packet is a preset service type;
        preferably forward the first downlink packet based on a real-time transmission indication when the service type of the first uplink packet is the preset service type and when the downlink 5-tuple information matches the uplink 5-tuple information; and not preferably forward a second downlink packet that corresponds to the downlink 5-tuple information and is not received within a specified time period, wherein the service type is the preset service type when the first uplink packet meets at least one of the following conditions: the uplink destination IP address provides a real-time transmission service, the uplink destination port provides the real-time transmission service, the uplink transmission protocol type is used for the real-time transmission service, a bandwidth of the first uplink packet is less than an uplink bandwidth threshold, or a packet length of the first uplink packet is less than an uplink packet length threshold.

10. The communications apparatus of claim 9, wherein the real-time transmission indication comprises one or more of a differentiated services code point (DSCP) value corresponding to a highest forwarding priority, a user priority (UP) value corresponding to the highest forwarding priority, or an access category (AC) corresponding to the highest forwarding priority.

11. The communications apparatus of claim 9, wherein the processor is configured to add uplink 5-tuple information from an uplink packet to a local routing and forwarding table of the communications apparatus.

12. The communications apparatus of claim 9, wherein the communications apparatus is further configured to limit a downlink packet bandwidth of a first specified station (STA).

13. The communications apparatus of claim 12, wherein the communications apparatus is further configured to:
forward a plurality of downlink packets to the first specified STA and limit a quantity of the downlink packets; or
forward the second downlink packet to the first specified STA and limit a continuous transmission time of the second downlink packet.

14. The communications apparatus of claim 12, wherein the communications apparatus is further configured to limit the downlink packet bandwidth when forwarding a third downlink packet to a second specified STA.

15. The communications apparatus of claim 9, wherein the communications apparatus is further configured to determine whether the service type of the first uplink packet is the preset service type before receiving the first downlink packet.

16. The communications apparatus of claim 9, wherein the communications apparatus is further configured to determine whether the service type of the first uplink packet is the preset service type after receiving the first downlink packet.

17. A computer program product comprising computer-executable instructions stored on a non-transitory computer-readable medium that, when executed by a processor, cause a communications apparatus to:
receive an uplink packet that carries uplink 5-tuple information, wherein the uplink 5-tuple information comprises an uplink source Internet Protocol (IP) address, an uplink destination IP address, an uplink source port, an uplink destination port, and an uplink transmission protocol type;
receive a downlink packet, wherein the downlink packet carries downlink 5-tuple information, and wherein the downlink 5-tuple information comprises a downlink source IP address, a downlink destination IP address, a downlink source port, a downlink destination port, and a downlink transmission protocol type;
determine whether a service type of the uplink packet is a preset service type;
preferably forward the downlink packet based on a real-time transmission indication when the service type of the uplink packet is the preset service type and when the downlink 5-tuple information matches the uplink 5-tuple information; and
not preferably forward a second downlink packet that corresponds to the downlink 5-tuple information and is not received within a specified time period,
wherein the service type is the preset service type when the uplink destination IP address is configured to provide a real-time transmission service, the uplink destination port provides the real-time transmission service, the uplink transmission protocol type is used for the real-time transmission service, a bandwidth of the uplink packet is less than an uplink bandwidth threshold, or a packet length of the uplink packet is less than an uplink packet length threshold.

18. The computer program product of claim 17, wherein the instructions further cause the processor to add uplink 5-tuple information from the uplink packet to a local routing and forwarding table of the communications apparatus.

19. The computer program product of claim 17, wherein the instructions further cause the processor to determine whether the service type of the uplink packet is the preset service type before receiving the downlink packet.

20. The computer program product of claim 17, wherein the instructions further cause the processor to determine whether the service type of the uplink packet is the preset service type after receiving the downlink packet.

* * * * *